US009044763B2

(12) United States Patent
Orubor

(10) Patent No.: US 9,044,763 B2
(45) Date of Patent: Jun. 2, 2015

(54) YARD AND GARDEN CHEMICAL DISPENSER

(76) Inventor: Lawrence Orubor, Calgary (CA)

( * ) Notice: Subject to any disclaimer, the term of this patent is extended or adjusted under 35 U.S.C. 154(b) by 900 days.

(21) Appl. No.: 13/169,177

(22) Filed: Jun. 27, 2011

(65) Prior Publication Data

US 2011/0315790 A1    Dec. 29, 2011

Related U.S. Application Data

(60) Provisional application No. 61/358,972, filed on Jun. 28, 2010.

(51) Int. Cl.
| | |
|---|---|
| B05B 7/26 | (2006.01) |
| B05B 7/04 | (2006.01) |
| B05B 7/24 | (2006.01) |
| A01C 23/04 | (2006.01) |
| B05B 15/06 | (2006.01) |
| A01M 7/00 | (2006.01) |
| B01F 1/00 | (2006.01) |
| B01F 3/00 | (2006.01) |
| B01F 7/00 | (2006.01) |
| B05B 3/04 | (2006.01) |

(52) U.S. Cl.
CPC .............. *B05B 7/0408* (2013.01); *B05B 7/2443* (2013.01); *A01C 23/042* (2013.01); *B05B 15/063* (2013.01); *A01C 23/047* (2013.01); *A01M 7/00* (2013.01); *B01F 1/0033* (2013.01); *B01F 3/00* (2013.01); *B01F 7/00916* (2013.01); *B05B 3/04* (2013.01)

(58) Field of Classification Search
USPC ......... 239/124, 142, 200, 266, 273, 275, 276, 239/279, 302, 310, 312, 315, 316, 317, 239/380; 222/167, 168; 422/269, 270; 137/268; 366/220
See application file for complete search history.

(56) References Cited

U.S. PATENT DOCUMENTS

| | | | | | |
|---|---|---|---|---|---|
| 1,185,319 | A | * | 5/1916 | Hodell | ............ 239/315 |
| 1,328,942 | A | * | 1/1920 | Carter | ............ 239/315 |
| 1,491,212 | A | * | 4/1924 | Thomson et al. | ............ 239/315 |
| 2,514,225 | A | * | 7/1950 | Dabrohua | ............ 137/268 |
| 3,680,504 | A | | 8/1972 | Seebald | |
| 3,996,953 | A | * | 12/1976 | Scragg | ............ 137/564.5 |
| 5,100,060 | A | | 3/1992 | Haferkorn | |
| 5,119,992 | A | | 6/1992 | Grime | |
| 5,213,265 | A | | 5/1993 | Englhard et al. | |
| 5,695,125 | A | | 12/1997 | Kumar | |
| 6,345,773 | B1 | | 2/2002 | Shanklin et al. | |
| 2007/0138320 | A1 | | 6/2007 | Timmes et al. | |
| 2008/0030032 | A1 | | 2/2008 | Gill | |

\* cited by examiner

*Primary Examiner* — Steven J Ganey
(74) *Attorney, Agent, or Firm* — Maxey Law Offices, PLLC; Stephen Lewellyn

(57) ABSTRACT

A chemical dispensing apparatus includes a housing that is connectable to a source of water, such as a standard garden hose, and an internal space in which is disposed a rotatable container containing a quantity of chemical concentrate to be mixed with the source of water as it flows through the housing and is dispensed from the housing from a sprinkler head or misting nozzle. The flow of water through the housing is directed to imping vanes on the rotatable container, such that the container is rotated as water flows through the housing. In an alternative embodiment, the vanes are replaced with an electric motor. Rotation of the container cause the chemical concentrate to dissolve which is then mixed with the water before it is dispensed through the sprinkler or mister.

14 Claims, 19 Drawing Sheets

YARD AND GARDEN CHEMICAL DISPENSER

CROSS-REFERENCE TO RELATED APPLICATIONS

This application claims the benefit of U.S. Provisional Application No. 61/358,972, filed Jun. 28, 2010, the entire of which is incorporated herein by reference.

FIELD OF THE INVENTION

The present invention relates generally to a yard or garden accessory enabling the automatic addition of a lawn treatment material, such as fertilizer, herbicide or insecticide, to the water being sprinkled on yard or garden.

BACKGROUND OF THE INVENTION

The proper treatment and care of yards and gardens is highly desirable to prevent destruction from insects and deterioration from malnutrition. The mixture and application of treatment solutions, however, is a time consuming procedure that requires close attention to chemical-water ratios and their distribution. Since proper care equates to scheduled maintenance, many lawns and gardens become neglected, resulting in unnecessary refurbishing costs. Moreover, lawns, gardens, and vegetation still fall victim to improper maintenance, despite consistent care when poorly balanced solutions are administered.

SUMMARY OF THE INVENTION

The yard and garden chemical dispenser of this invention provides an apparatus for incorporation into a water supply system a way to deliver lawn treatment chemicals such as fertilizer, herbicide or insecticide to lawns, yards and other botanical and life systems by the controlled application of the chemicals in amounts and periods.

In general, in one aspect, a chemical dispensing apparatus for use in delivery of a treatment solution to a lawn is provided. The apparatus includes a main fluid supply passage configured for connection to a pipe system carrying water under pressure. A housing includes an internal cavity, an end having an opening into the internal cavity, a discharge port and a drain port. A fluid discharge passage connects the discharge port and the internal cavity. An internal fluid supply passage connects the main fluid supply passage to the internal cavity. A drain passage connects the internal cavity to the drain port. A float valve is disposed across the drain passage and across the internal fluid supply passage and includes a float that is displaced by a fluid flow through the internal fluid supply passage from the main fluid supply passage from a first position where the drain passage is open and the internal fluid supply passage is sealed by the float to a second position where the internal fluid supply passage is open and the drain passage is sealed by the float. The float returns to the first position when the fluid flow is stopped. A container is removably disposed within the internal cavity and supported for rotation therein about a vertical axis, the container configured for the reception of a chemical concentrate. The container has vanes extending the circumference thereof and a nozzle is disposed across the internal fluid passage and arranged to direct a jet of water at the vanes. Impingement of the jet of water on the vanes causing the container to rotate about the vertical axis. A lid is removably attached to the housing and seals the opening into the internal cavity when attached to the housing.

In general, in another aspect, a chemical dispensing apparatus further includes an internal reservoir tank connected inline to the drain passage intermediate the float valve and the drain port to receive and hold a quantity of fluid flowing through the drain passage from the internal cavity. A one-way valve is connected to the drain passage at an upstream end from the internal reservoir tank. A second drain valve is connected to the drain passage at a downstream end from the internal reservoir tank. A siphon tube connects the internal reservoir tank and the fluid discharge passage, wherein a fluid flow through the fluid discharge passage results in a vacuum on the siphon tube that causes fluid contained within the internal reservoir tank to be drawn into the fluid flow.

In general, in another aspect, a chemical dispensing apparatus for use in delivery of a treatment solution to a lawn is provided. The apparatus includes a main fluid supply passage configured for connection to a pipe system carrying water under pressure. A housing includes an internal cavity, an end having an opening into the internal cavity, a discharge port and a drain port. A fluid discharge passage connects the discharge port and the internal cavity. An internal fluid supply passage connects the main fluid supply passage to the internal cavity. A drain passage connects the internal cavity to the drain port. A drain valve is disposed across the drain passage and operable to permit or preclude the flow of fluid through the drain passage. A container is removably disposed within the internal cavity and supported for rotation therein about a vertical axis and configured for the reception of a chemical concentrate. A bypass fluid passage connects the main fluid supply passage to the fluid discharge passage. A control valve connects the main fluid supply passage, the fluid bypass passage and the internal fluid supply passage and operable to selectively permit or preclude the flow of fluid from the main fluid supply passage through the bypass passage and the internal fluid supply passage. An electric motor is operatively connected to the container when the container is disposed within the internal cavity and operable to rotate the container about the vertical axis. A lid is removably attached to the housing, the lid sealing the opening into the internal cavity when attached to the housing.

In general, in another aspect, a chemical dispensing apparatus for use in delivery of a treatment solution to a lawn is provided. The apparatus includes a housing having an internal cavity, an end having an opening into the internal cavity, a discharge port and a drain port. A fluid supply passage is connected to the internal cavity and is configured for connection to a pipe system carrying water under pressure. An electrically operated supply valve is disposed across the fluid supply passage and passage and operable to selectively permit or preclude the flow of through the fluid supply passage. A fluid discharge passage connects the discharge port and the internal cavity. A drain passage connects the internal cavity to the drain port. An electrically operated drain valve is disposed across the drain passage and operable to selectively permit or preclude the flow of fluid through the drain passage. A container is removably disposed within the internal cavity and supported for rotation therein about an axis of rotation, the container configured for the reception of a chemical concentrate. An electric motor is operatively connected to the container when the container is disposed within the internal cavity and operating to rotate the container about the axis of rotation. A lid is removably attached to the housing and sealing the opening into the internal cavity when attached to the housing.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Figure 1:
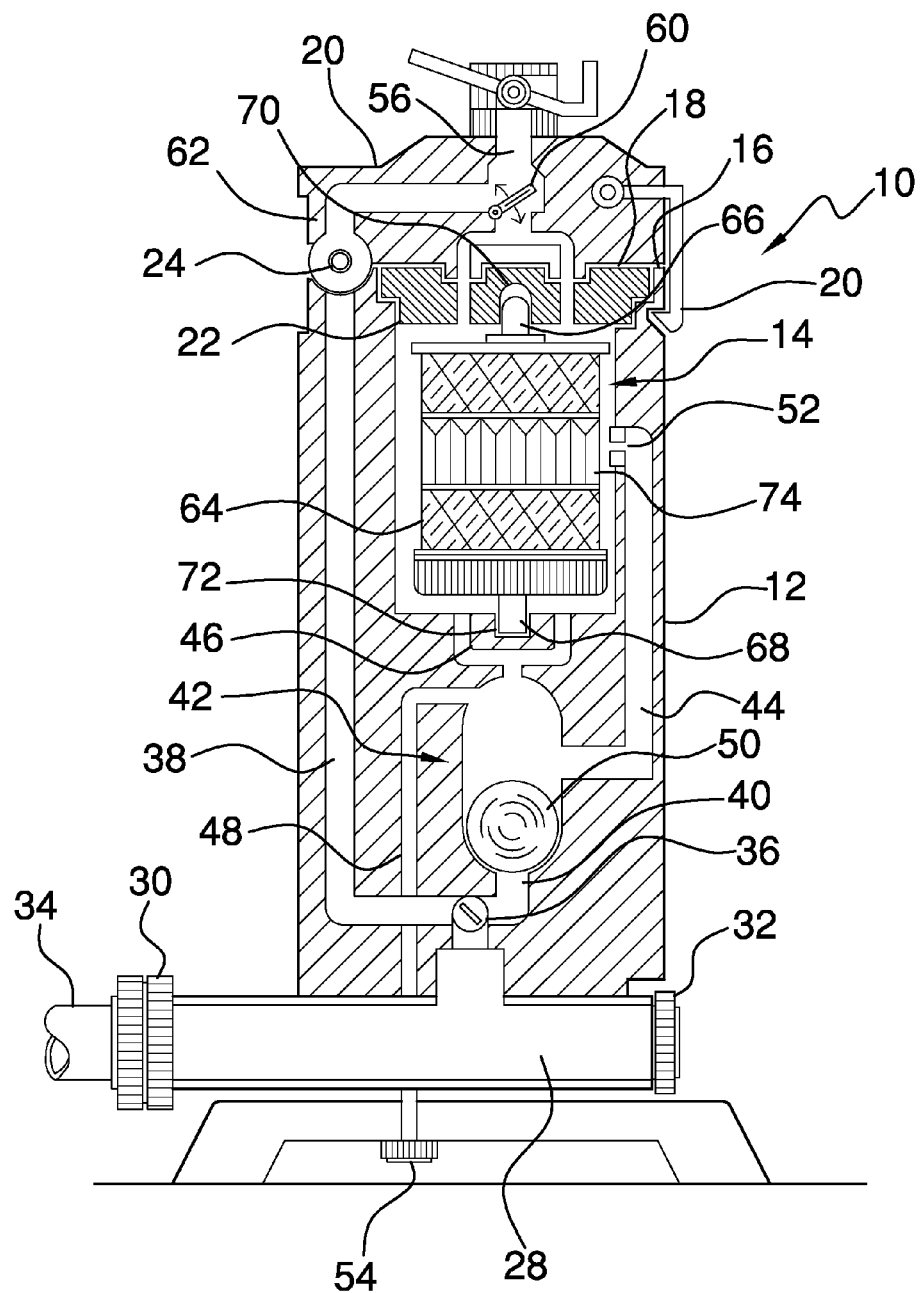
FIG. 1 is a diagrammatic illustration of a specially designed lawn and garden chemical dispenser in accordance with the principals of the invention.
Figure 2:
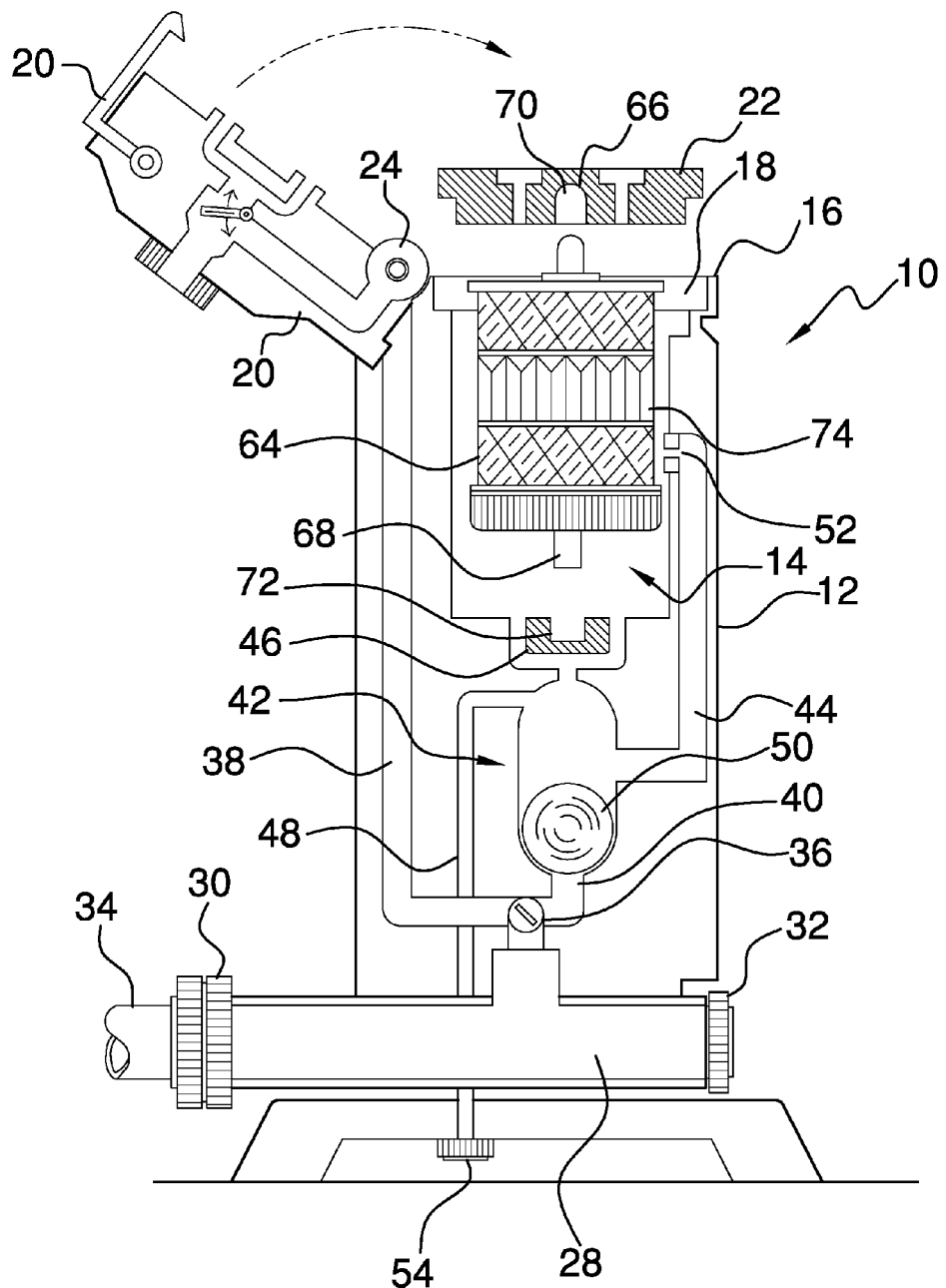
FIG. 2 is a diagrammatic illustration of the dispenser of FIG. 1 showing the lid open and components exploded.

Diagrammatically illustrated in FIGS. 1 and 2 is a specially designed lawn and garden chemical dispenser 10 particularly useful in dispensing chemicals for treating a lawn or garden. In FIG. 1, the dispenser 10 is shown assembled, and in FIG. 2, the dispenser is shown partially disassembled. The dispenser 10 includes a housing 12 that includes an internal chemical mixing chamber or cavity 14 in which a chemical solution is created for dispensing, as will be discussed in further detail below. Cavity 14 extends through end 16 of the housing 12 providing an opening 18 (best seen in FIG. 2) into the cavity. The opening 18 is closed by a cover or lid 20. A seal 22 is disposed between the lid 20 and end 16 of the housing to provide a sealing contact therebetween creating a water tight enclosure.

As shown, lid 20 is pivotally attached to the housing 12, for example by pivot coupling 24 for rotation between closed and open positions as shown in FIGS. 1 and 2, respectively. A clamp 21 carried by the lid 20 engages the housing 12 in a cooperative fashion to secure the lid in the closed position and seal opening 18. Alternatively, the clamp 20 could be attached to the housing 12 and engage the lid 16 in a similarly fashion to secure the lid in the closed position.

Housing 12 further includes several fluid flow conduits or passages that can be integral with the housing or separate tubes extending the housing. Of these passages is included a main fluid passage 28 that extends generally laterally through housing 12 about the bottom thereof, and is fitted with hose couplings 30 and 32 at opposite ends thereof. Hose couplings 30, 32 permit the connection of hoses, such has a garden hose 34, to the dispenser 10 to provide a source and to further permit the interconnection of the dispenser to additional dispenser devices.

Still referring to FIGS. 1 and 2, a three-way valve 36 fluidically connects the main fluid passage 28 to a by-pass passage 38 and a first supply passage 40. A valve system 42 fluidically connects the first supply passage 40, a second supply passage 44, and first and second drain passages 46 and 48. Valve system 42 includes a weight ball 50 that is positionable under the force of pressurized water flowing through the valve system and under the force of gravity when pressured water is not flowing through the valve system. The valve system 42, as will be described in further detail below, operates in first mode when pressurized water flows into the valve system through main passage 28 to permit the flow of water/fluid between fluid passages 40 and 44 while precluding the of flow water/fluid through passages 46 and 48. The valve system 42 operates in a second mode to permit the flow of water/fluid between passages 46, 48 and 44 while precluding flow through passage 40 when pressurized water is not flowing through the valve system.

The second supply passage 44 extends from the valve system 42 at one end and terminates at a nozzle 52 extending or opening into the cavity 14. Drain passage 46 extends from the bottom of the cavity 14 at one end and terminates at the top of the valve system 42. Drain passage 48 extends from the valve system 42 at one end and terminates at a drain port 54.

The by-passage 38 extends from valve 36 at one end and is fluidically connected to a discharge port 56 at the opposite end. A discharge passage 58 is fluidically connected to the cavity 14 through seal 22 and lid 20 to the discharge port 56. A flap valve 60 extends the by-passage 38 and the discharge passage 58 to seal one of the passage as water flows through the opposite. A fluidic joint 62 extends the by-pass passage 38 at coupling 24 to permit the lid 20 to rotate while maintaining the by-passage 38 as it extends across the housing 12 into the lid 20.

Still referring to FIGS. 1 and 2, a receptacle 64 is disposed within cavity 14 and is supported therein for rotation about a substantially vertical axis thereof by shafts 66 and 68 extending opposite ends of the receptacle. Seal 22 includes a shaft mount 70 that supports shaft 66 for rotation. Housing 12 includes shaft mount 72 that supports shaft 68 for rotation. Shafts 66 and 68 are removably seated in there respective shaft mounts 70 and 72. Receptacle 64 is configured to receive or contain a chemical concentrate in either a solid or granular form. In embodiments, the receptacle 64 is porous to permit the chemical concentrate to be dissolved by and admixed with water flowing into the cavity 14 to create a chemical solution for discharge.

Extending the circumference of the receptacle 64 is a ring of vanes 74 which is acted upon by a jet of water discharged from nozzle 52 to cause the receptacle to rotate about the vertical axis. Rotation of the receptacle is two fold, it permits increased contact between the water/chemical solution in cavity 14 and the chemical concentrate to further advance dissolving the chemical concentrate, and it provides a mixing action within the cavity to evenly admix the chemical concentrate.

Figure 3:
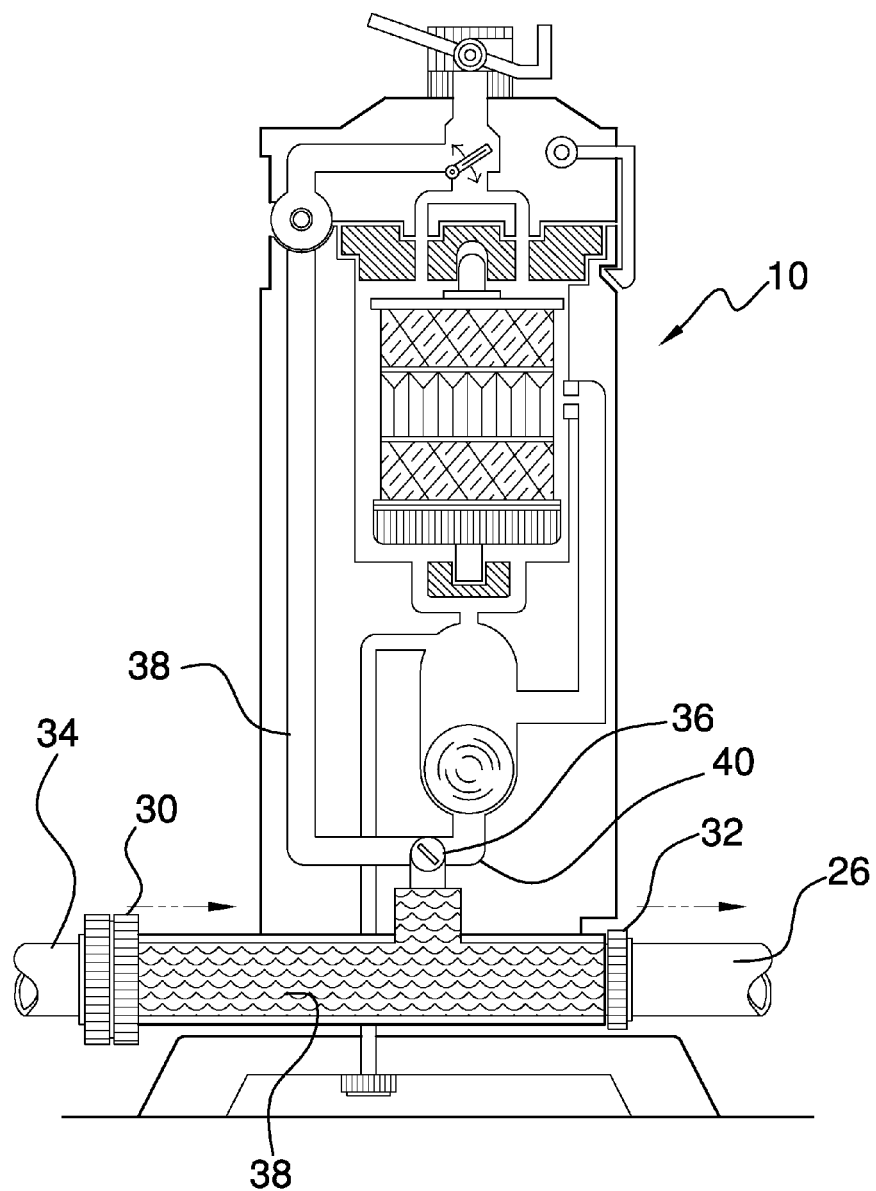
FIG. 3 is diagrammatic illustration the dispenser in a first mode of operation where the dispenser is by-passed.

In FIG. 3, there is diagrammatically illustrated the dispenser 10 in a first mode of operation where the dispenser is by-passed. Here a supply hose 34 carrying a supply of pressurized water is connected to hose coupling 30, a second hose 76 is connected to hose coupling 32. Valve 36 is positioned in a first position where water is only permitted to flow through the main supply passage 28 and not permitted to flow from the main supply passage into either of passages 38 or 40. Accordingly, water from supply hose 34 flows through passage 28 into hose 76 bypassing the dispenser 10.

Figure 4:
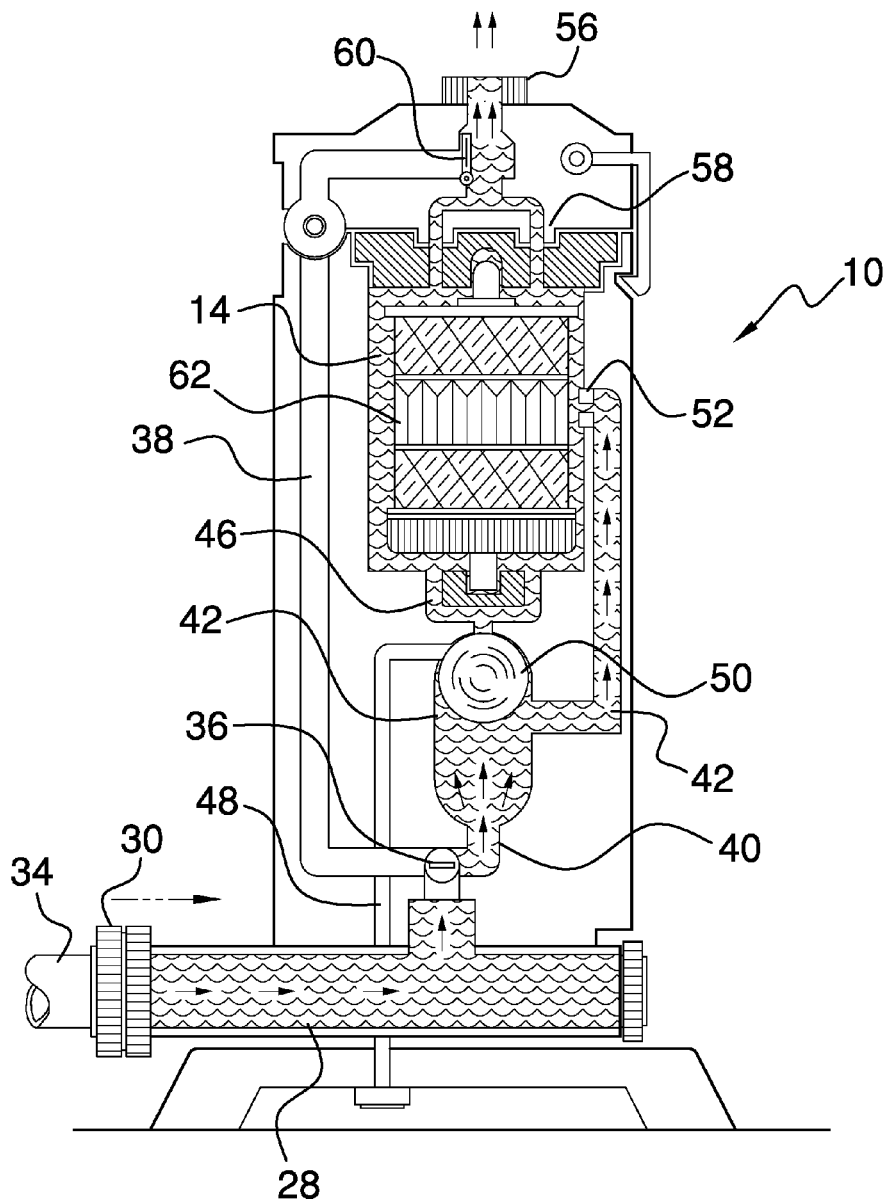
FIG. 4 is a diagrammatic illustration of the dispenser in a second mode of operation where the dispenser is operating to dispense a chemical solution.

In FIG. 4, there is diagrammatically illustrated the dispenser 10 in a second mode of operation where the dispenser is operating to dispense a chemical solution. Here a supply hose 34 carrying a supply of pressurized water is connected to hose coupling 30, thereby providing a flow of pressurized water in the main supply passage 28. Valve 36 is positioned in a second position, where the flow of pressurized water flows through valve 36 and into passage 40 and into valve system 42. As the pressurized water flows into valve system 42 the ball 50 is caused to rise under the force of the flowing water. With the ball 50 in the raised position, the ball seals passages 46 and 48 and permits fluid connection between passages 40 and 42. Accordingly, the pressurized water continues to flow through passage 42 and through nozzle 52 where it is jetted into the cavity 14 and impinges against the ring of vanes 62 causing the receptacle to rotate. As the water flows through cavity 14, the chemical concentrate dissolves and is admixed with the water to form a chemical solution. Once cavity 14 is filled, the flow of water/chemical solution continues to flow through discharge passage 58, operating valve 60 to seal passage 38, and then through discharge port 56 where it is dispensed.

Figure 5:
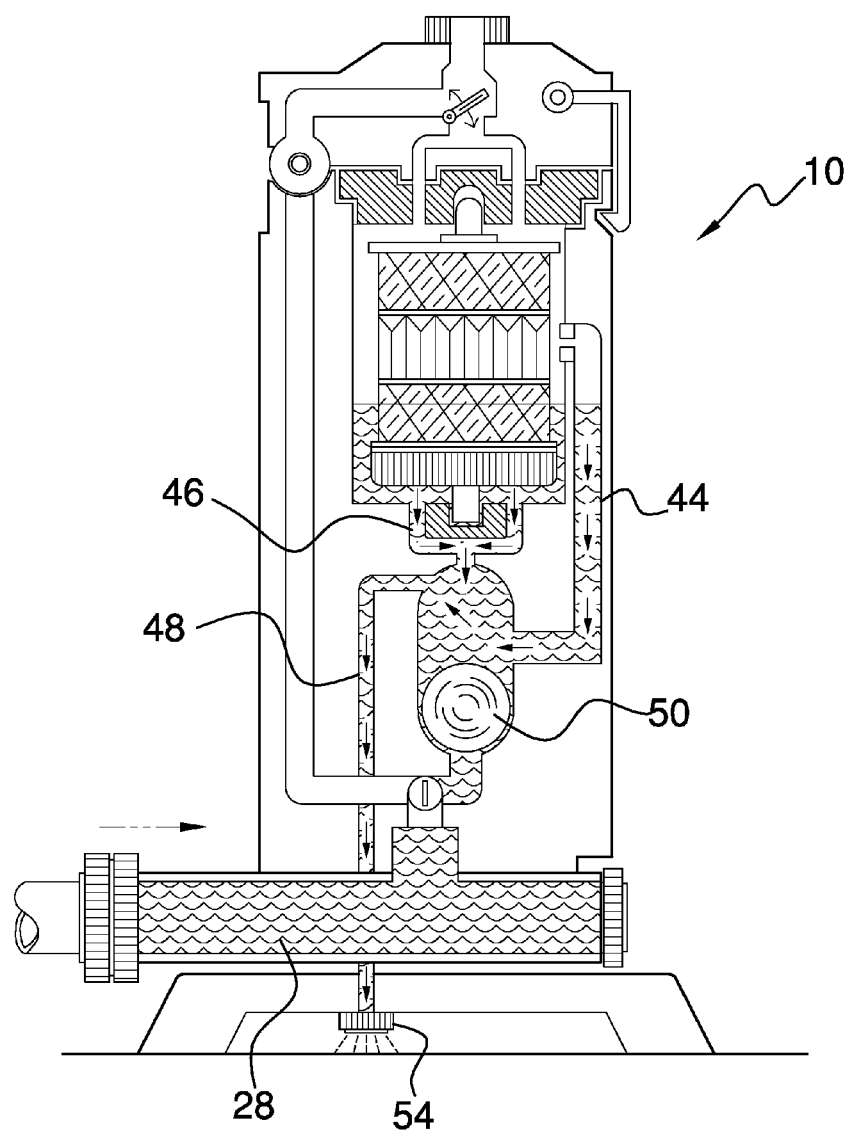
FIG. 5 is a diagrammatic illustration of the dispenser in a third mode of operation where the dispenser is operating to drain.

In FIG. 5, there is diagrammatically illustrated the dispenser 10 in a third mode of operation where the dispenser is operating to drain. Here, the flow of pressurized water into the main passage 28 is stopped from flowing from the source of the pressurized water. Accordingly, ball 50 is falls under the force of gravity, and thus fluidically connecting passages 44, 46 and 48 where water/chemical solution within these passages and cavity 14 is permitted to drain through drain port 54.

Figure 6:
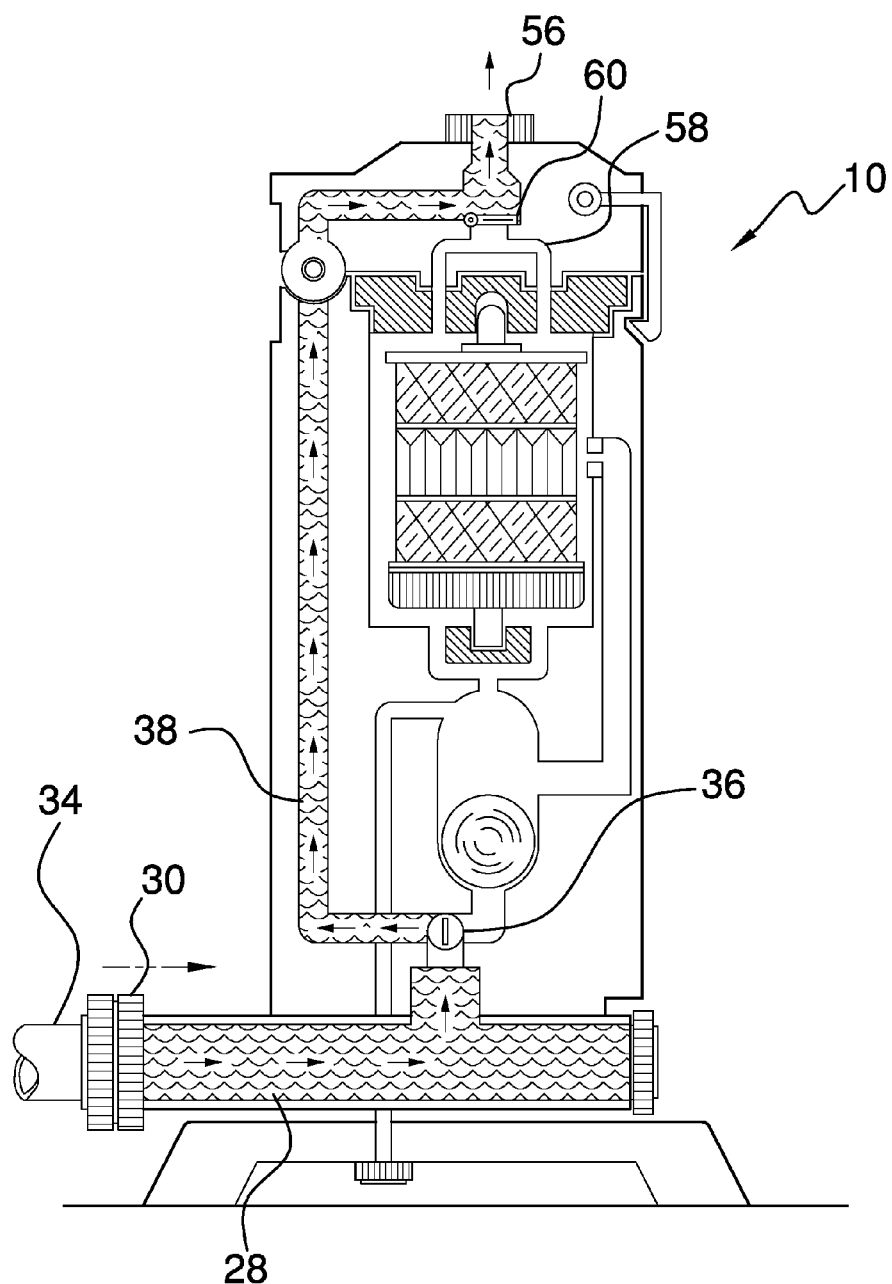
FIG. 6 is a diagrammatic illustration of the dispenser in a fourth mode of operation, where the dispenser is operating to dispense fresh water.

In FIG. 6, there is diagrammatically illustrated the dispenser 10 in a fourth mode of operation, where the dispenser is operating to dispense fresh water. Here a supply hose 34 carrying a supply of pressurized water is connected to hose coupling 30, thereby providing a flow of pressurized water in the main supply passage 28. Valve 36 is positioned in a third position, where the flow of pressurized water flows through valve 36 and into passage 38, operating valve 60 sealing passage 58, and discharged through discharge port 56.

Figure 7:
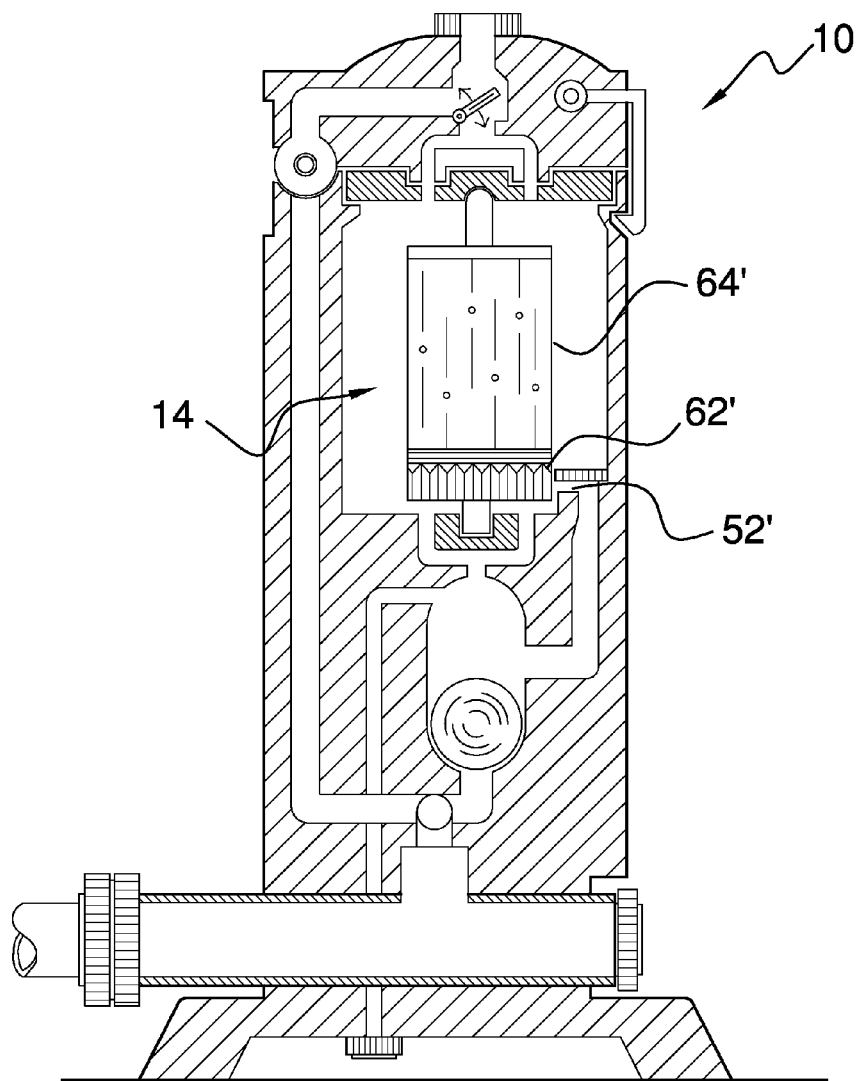
FIG. 7 is a diagrammatic illustration of an alternative construction of the dispenser.
Figure 8:
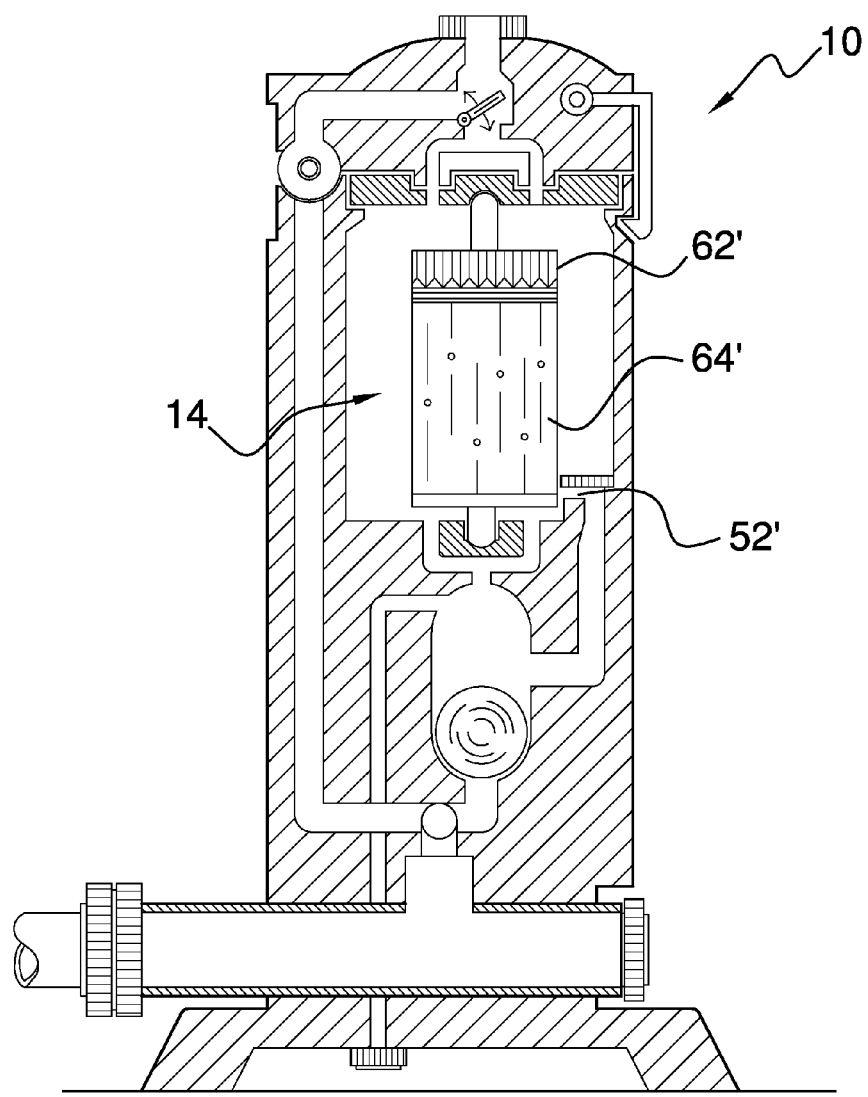
FIG. 8 is a diagrammatic illustration of the dispenser of FIG. 7 in an alternative configuration.

In FIG. 7, there is diagrammatically illustrated of an alternative construction of the dispenser 10. Here receptacle 64' includes a ring of vanes 62' located about one end of the receptacle. Similarly, nozzle 52' is positioned to impinge the flow of water therethrough upon the ring of vanes 62' when receptacle 64' is disposed within cavity 14 with the ring of vanes 62' inward. This construction of receptacle 64' and nozzle 52' permits a user to position the receptacle 64' in cavity 14 with either the ring of vanes 62' inward, as shown in FIG. 7, or outward as shown in FIG. 8. In the outward position, as shown in FIG. 8, the flow of water through nozzle 52' does not impinge the ring of vanes 62' and thus the receptacle is not caused to rotate. Whereas with the receptacle 64' installed with the ring of vanes 62' in the inward position, the receptacle 64' is caused to rotate.

Figure 9:
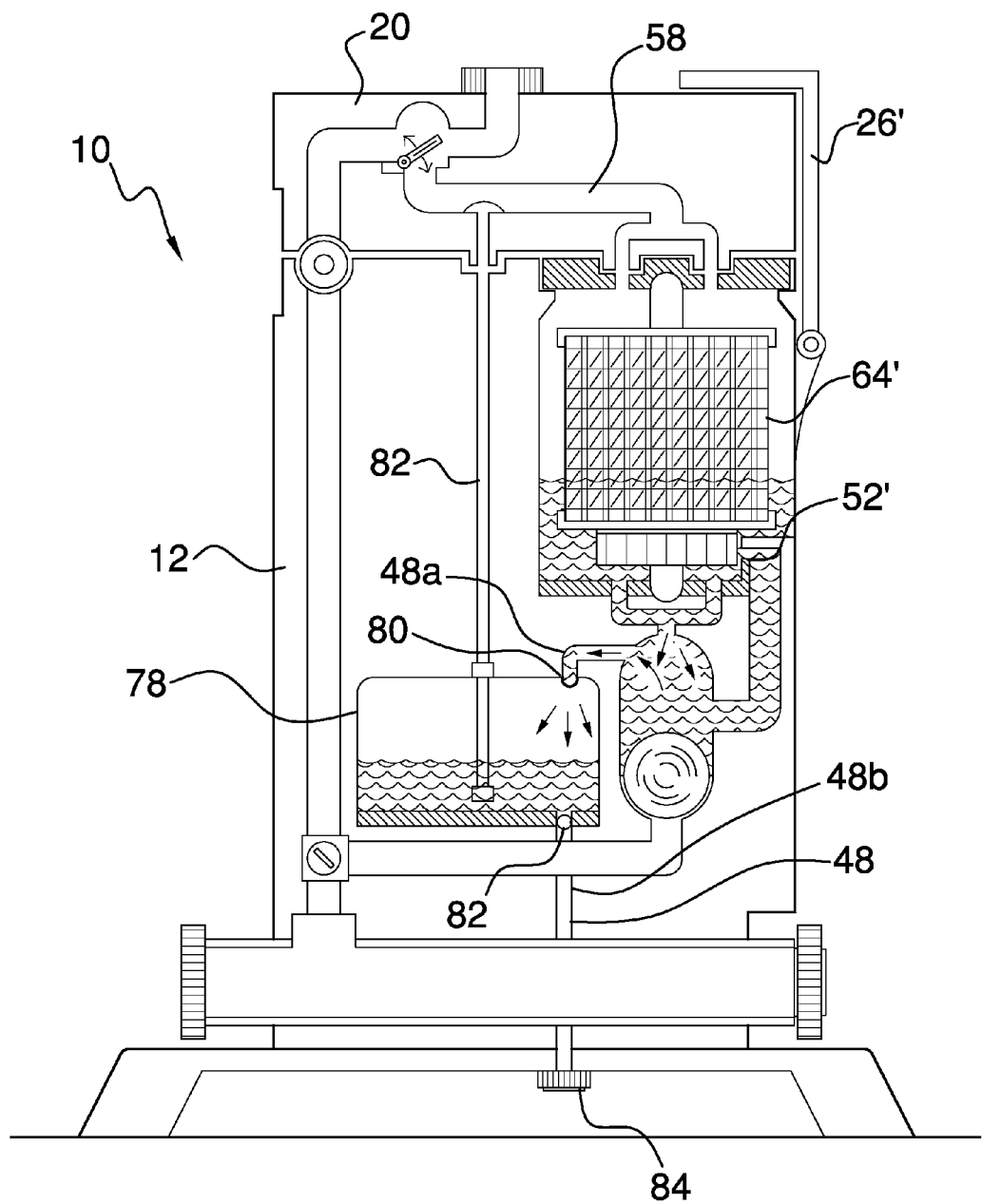
FIG. 9 is a diagrammatic illustration of a second alternative construction of the dispenser of FIG. 1.

In FIG. 9, there is diagrammatically illustrated a second alternative construction of the dispenser 10. Here, the dispenser 10 includes an optional chemical solution storage tank 78. The storage tank 78 can be integral with housing 12 or could be separate therefrom. The storage tank 78 is disposed across passage 48 dividing passage 48 into passages 48a and 48b to receive therein chemical solution during the third mode of operation for storage as opposed to being discarded. A check valve 80 is disposed across passage 48a to prevent back flow of chemical solution from the storage tank 78. A valve 82 is disposed across passage 48b and operable to permit draining of chemical solution from the storage tank 78 through drain port 54.

With continued reference to FIG. 9, the dispenser 10 further includes a siphon pick-up tube 82 extending from within the storage tank 78 to passage 58. As water/chemical solution from tank 14 flows through passage 58 and across the end of siphon tube 82, chemical solution contained within storage tank 78 is drawn through siphon tube 82 and into the water/chemical flow.

Still referring to FIG. 9, there is further shown an alternative clamp 26' that is pivotally attached to the housing 12 as opposed to the lid 20. Additionally, receptacle 64' and nozzle 52' are illustrated. Alternatively, receptacle 64 and nozzle 52 could be employed here.

Figure 10:
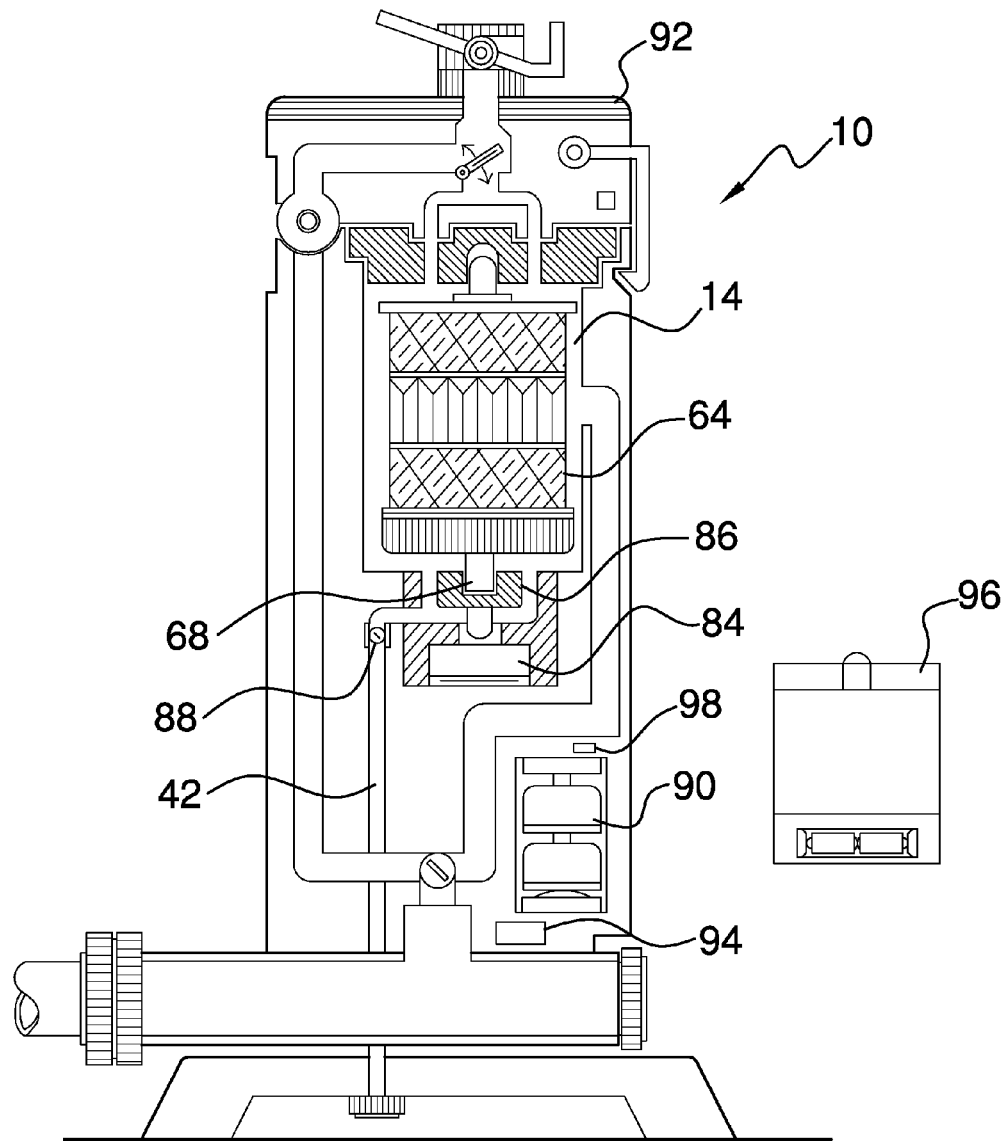
FIG. 10 is a diagrammatic illustration of another alternative construction of dispenser of FIG. 1.

In FIG. 10, there is diagrammatically illustrated yet another alternative construction of dispenser 10. Here, an electric motor 84 is operatively connected to shaft cradle 86 to rotationally drive shaft cradle about a substantially vertical axis. Shaft cradle 86 is configured to receive therein shaft 68 of receptacle 64 for conjoined rotation. Thus, operation of electric motor 84 results in rotation of receptacle 64 about the vertical axis. Further, valve system 42 is removed, there by eliminate passages 44 and 48, and further eliminate fluidic connection therebetween. Alternative to valve system 42, an electric valve 88 is placed across passage 42 and is operated to permit draining of chemical solution from cavity 14. Valve 88 can include a manual lever to manually operate the valve. Valve 88, and electric motor 84 are each electrically connected to a source of power, such as batteries 90. A solar panel 92 can be provided to charge batteries 90 or to provide supplemental or alternative power to valve 88 and electric motor 84. Alternatively, electrical power could be supplied by connection to an external source of power. A controller 94 is electrically connected to valve 88 and motor 84 and is programmed to effect the operation of each accordingly to a desired preprogrammed control. A wireless controller 96 can also be provided to permit remote operation of the dispenser. The wireless controller 96 can communicate to the controller 94 through receiver 98 configured to receive signals from the wireless controller.

Figure 11:
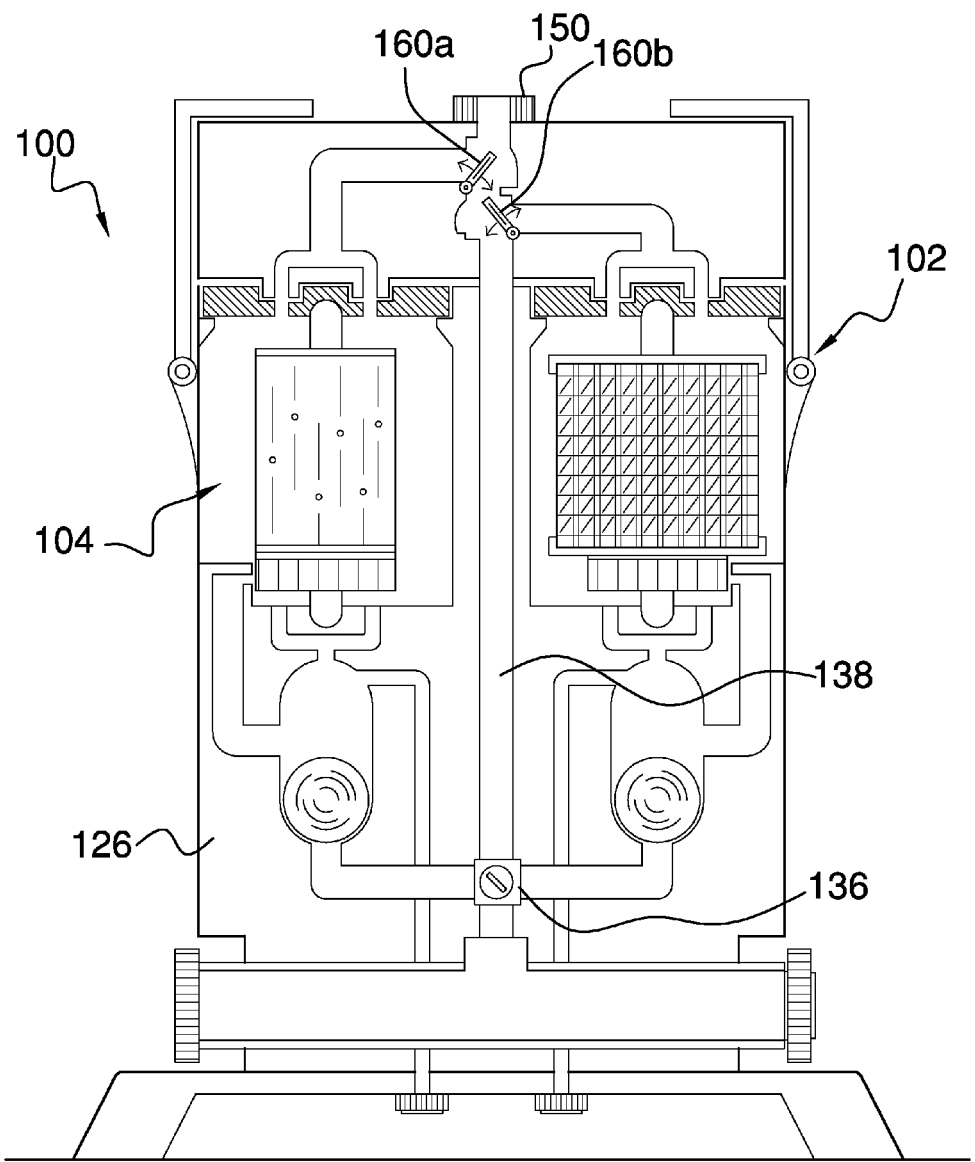
FIG. 11 is a diagrammatic illustration of another alternative construction of the dispenser of FIG. 1.

In FIG. 11, there is diagrammatically shown yet another alternative construction of the dispenser 10. Here dispenser 100 comprises essentially any of the alternative constructions of dispenser 10 described herein, but in a dual construction wherein dispenser 100 includes two dispenser units 102 and 104 integrated into a single unit housing 126. Dispenser units 102 and 104 could be completely separated for independent and concurrent operation, or can be partially integrated together as illustrated for alternating use. Dispenser units 102 and 104 can take the form of any of the constructions of dispenser 10. However, as illustrated, dispenser units 102 and 104 are each of similar construction of dispenser 10 illustrated in FIG. 7, with a few exceptions. Primarily the dispenser units 102 and 104 share a common bypass passage 138, and the three-way valve 36 is replaced by a four-way valve 136. Additionally, two flapper valves 160a and 160b are placed across discharge passage 158. It is believed the above description with regard to the construction and operation of the dispenser 10 is sufficient to understand the construction and operation of dispenser 100 here.

Figure 12:
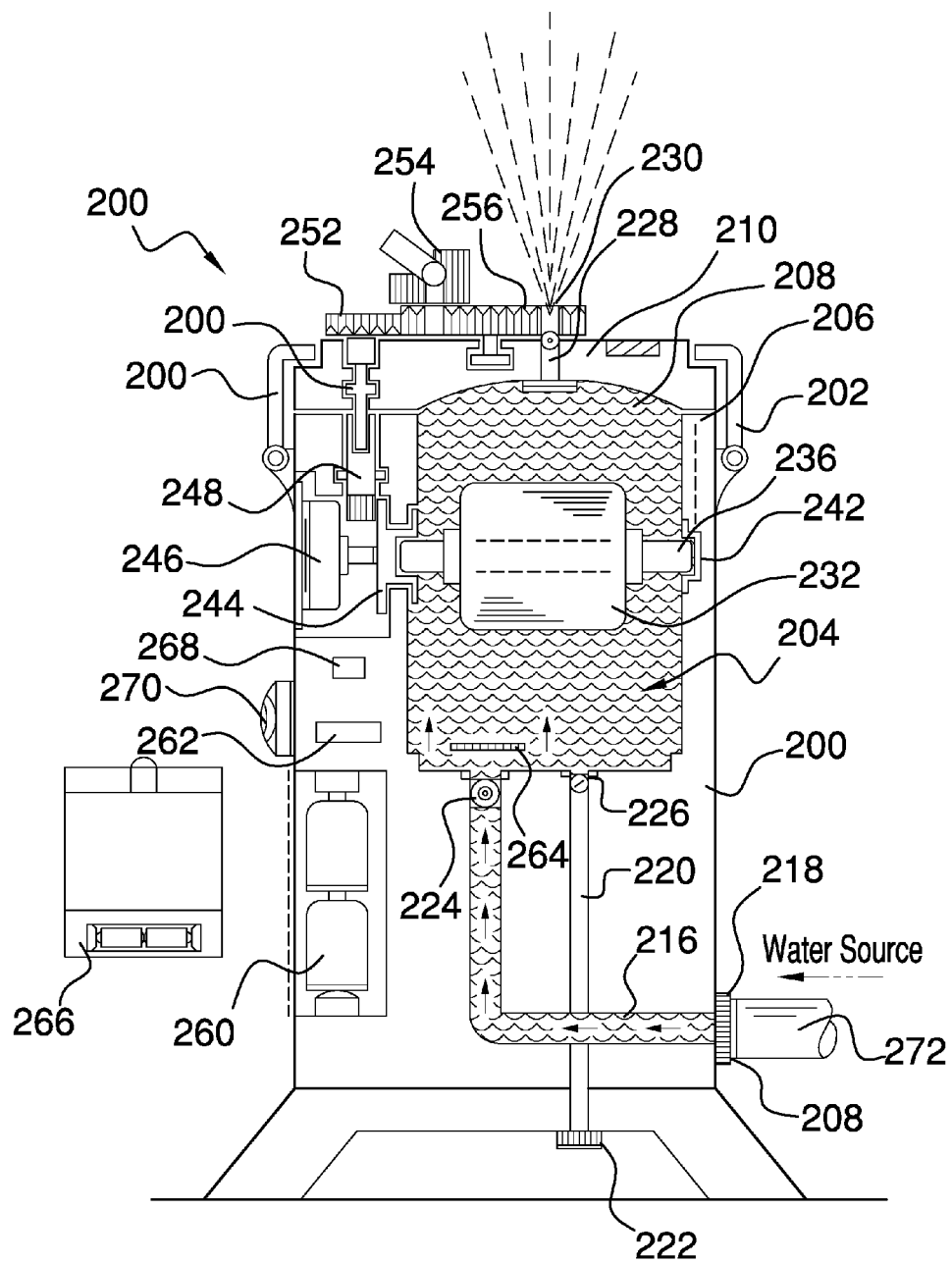
FIG. 12 is a diagrammatic illustration of a second embodiment of a yard and garden chemical dispenser.

In FIG. 12, there is diagrammatically illustrated a dispenser 200. Dispenser 200 includes a housing 202 that includes an internal mixing chamber or cavity 204 in which a chemical solution is created for dispensing, as will be discussed in further detail below. Cavity 204 extends through end 206 of the housing 202 providing an opening 208 into the cavity. The opening 208 is closed by a cover or lid 210. A seal not shown can be disposed between the lid 210 and end 206 of the housing 202 to provide a sealing contact therebetween creating a water tight enclosure.

As shown, lid 210 is removably attached to the housing 202 and is secured to the housing by a pair of clamps 212 and 214 that cooperatively engage the lid to secure the lid 210 to end 206 of the housing. Alternatively, the clamps 212 and 214 could be attached to the lid 210 and engage the housing 202 in a similarly fashion to secure the lid.

Still referring to FIG. 12, housing 202 further includes several fluid flow conduits or passages that can be integral with the housing or separate tubes extending the housing. Of these passages is included a water supply passage 216 that extends from one end fitted with a hose coupling 218 to the cavity 204 at a second end. A drain passage 220 extends from the cavity 204 at one end and terminates at the opposite end at a drain port 222. Valves 224 and 226 disposed across passages 216 and 220, respectively, are operated to control the flow of fluid through the respective passage, which will be described in more detail below. A discharge passage 228 fluidically connects the cavity 204 to discharge port 230.

A receptacle 232 for containing a solid or particulate chemical concentrate is disposed within cavity 14. The receptacle 232 is supported therein for rotation about a substantially horizontal axis of rotation thereof by shafts 234 and 236 extending opposite ends of the receptacle. Shaft 234 is supported by shaft mount 240, and shaft 236 is supported for rotation by shaft mount 242. Shaft mount 240 is carried by transition member 244 that is supported for rotation about the horizontal axis of rotation. Shaft mount 242 and shaft 234 are configured such that the shaft mount 242 receives shaft 234 for conjoined rotation therewith. An electric motor 246 is operatively connected to transition member 244 for rotatably driving the transition member about the horizontal axis of rotation, and thus rotatably driving the receptacle 232.

Still referring to FIG. 12, an intermediate shaft 248 is supported for rotation about a vertical axis of rotation. The intermediate shaft 248 cooperatively engages transition member 244, for example through a geared coupling, such that rotation of transition member about the horizontal axis causes the intermediate shaft to rotate about the vertical axis. A driven shaft 250 is supported by the lid 210 for rotation about the vertical axis and for engagement with intermediate shaft 248 for conjoint rotation therewith, for example through a splined coupling. Driven shaft 250 is conjoined with gear 252 which is in mesh with gear 254, which is in turn meshed with gear 256. Gears 254 and 256 are rotatably supported by lid 210. Discharge port 230 extends gear 256 permitting the attachment of a spray head to gear 256 in fluidic communication with the discharge port, as will be discussed in more detail below.

A power source, such as batteries 260 provide electrical power to the electric motor 238 and valves 224 and 226 and various other components. A controller 262 is operatively connected to the electric motor 238 and valves 224 and 226, and is programmed to control the operation of the electric motor and the valves in accordance with desired modes of operation. Alternatively or in addition solar panels, or a source of external power can be used to power the dispenser 200. Further, a sensor 264 can be disposed to sense the concentration of a chemical solution contained within cavity 204, and the controller 262 and further operate based on the sensed chemical solution to operate the electric motor 238 and the valves 224 and 226. Further, a remote control 266 can be provided to permit a user the ability to control the operation of the dispenser remotely. A receiver 268 operates to receive command signals from the remote control and transmit them to the controller 262. A main power switch 270 can be provided to control the overall operation of the dispenser 200.

Figure 13:
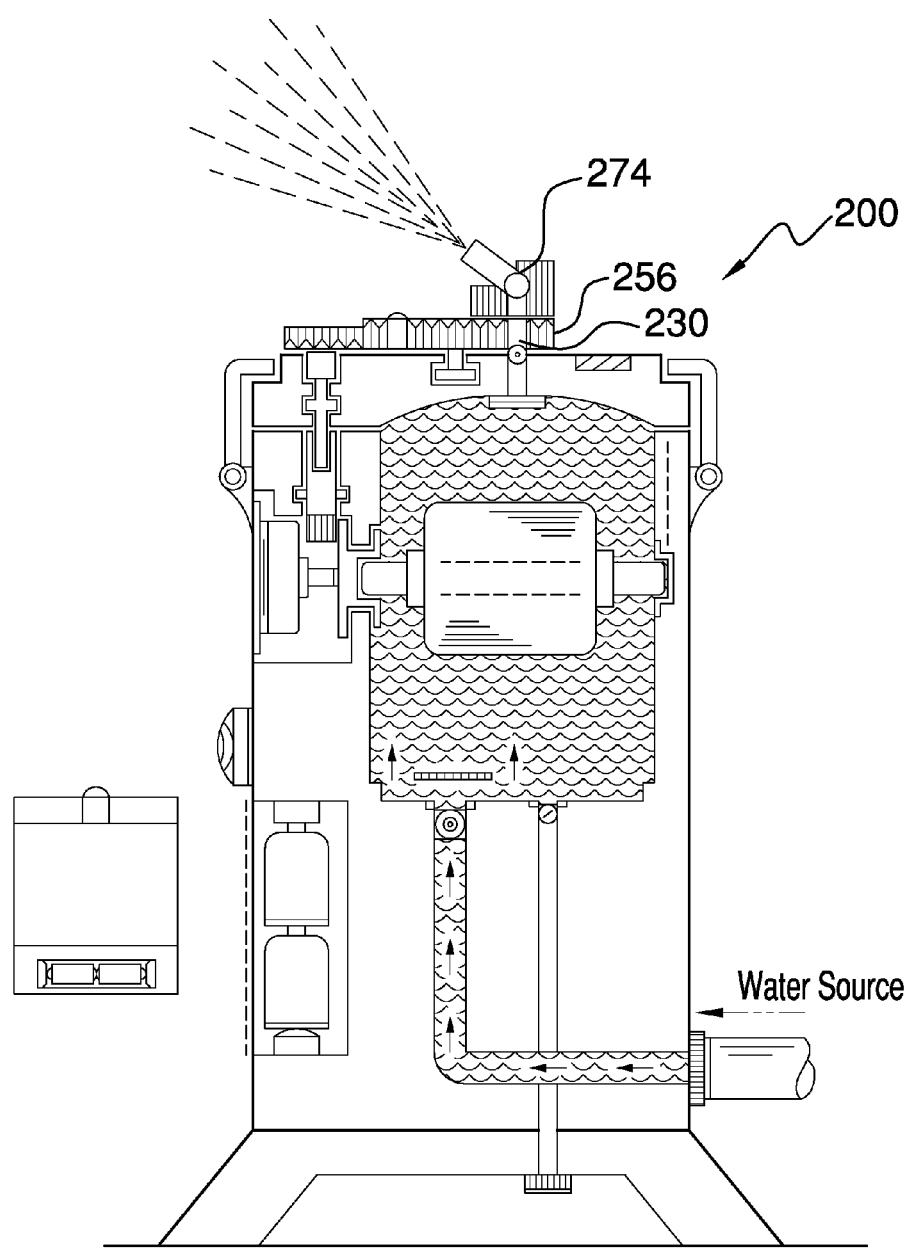
FIG. 13 is a diagrammatic illustration of the dispenser of FIG. 12 in an alternative configuration.

Still referring to FIG. 12, a garden hose 272 connected to a supply of pressurized water is connected to hosing coupling 218 to provide a flow or pressurized water through passage 216. In a first mode of operation, as illustrated, valve 224 is actuated to permit the flow of pressurized water into cavity 204. In cavity 204, the chemical concentrate dissolves and admixes with the water creating a chemical solution. The rate in which the chemical concentrate dissolves, and thus the concentration of the chemical solution is controlled through operation of the electric motor 238 which drives the rotation of the receptacle 232. As cavity 204 continues to fill, the chemical solution is discharged through discharged port 230, as shown here as a mist. In FIG. 13, the dispenser 200 is shown in use in the first mode of operation with a sprayer head 274 secured to gear 256 for conjoint rotation therewith and in fluidic communication with the discharge port 230 to receive a flow of chemical solution therefrom and dispense it as the sprayer head 274 is rotated along with gear 256.

In a second mode of operation, not illustrated, valve 224 is closed and thus preventing the flow of water into the cavity 204, and valve 226 is opened to drain the cavity of chemical solution through drain port 230.

Figure 14:
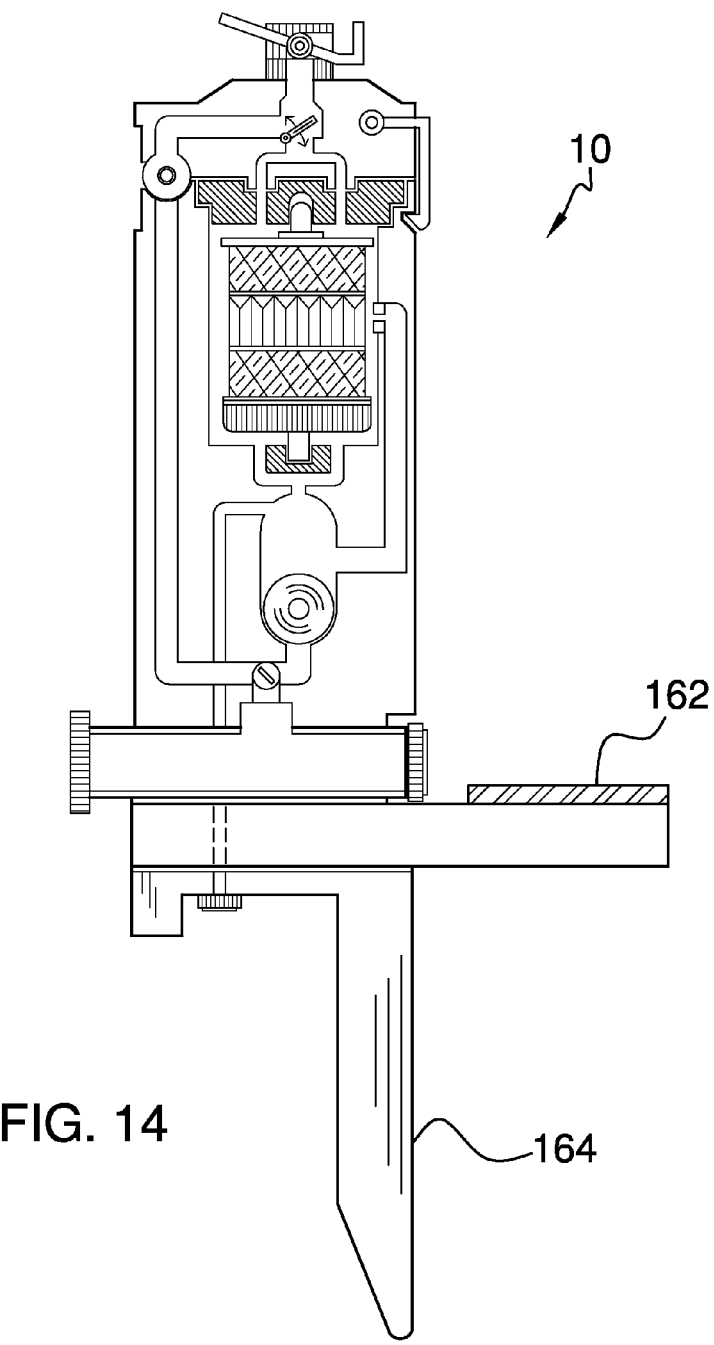
FIG. 14 is a diagrammatic illustration of another alternative construction of the dispenser of FIG. 1.

In FIG. 14, there is diagrammatically illustrated an alternative construction of the dispenser 10. Here, the dispenser 10 includes a foot step 162 and a ground spike 164 for securing the dispenser 10 to a soft ground surface by inserting the ground spike into the ground. A user can step on the foot step 162 to aid in inserting the ground spike 164 into the ground.

Figure 15:
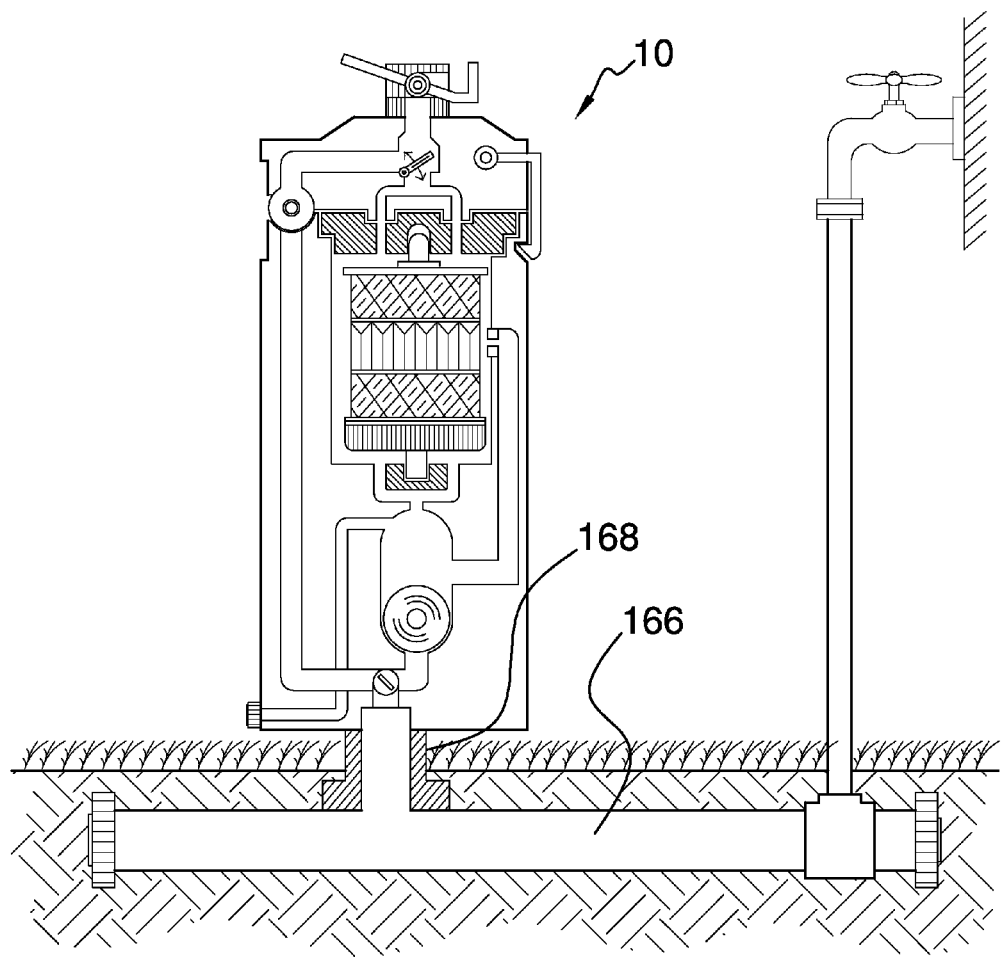
FIG. 15 is a diagrammatic illustration of another alternative construction of the dispenser of FIG. 1.

In FIG. 15, there is diagrammatically illustrated an alternative construction of the dispenser 10. Here, the dispenser 10 is configured to be hard plumbed with an water sprinkler system supply conduit 166. Supply conduit 166 replaces the main fluid passage 28. The dispenser 10 is further fitted with a pipe coupling 168 to permit coupling of the supply conduit 166 to the dispenser 10.

Figure 16:
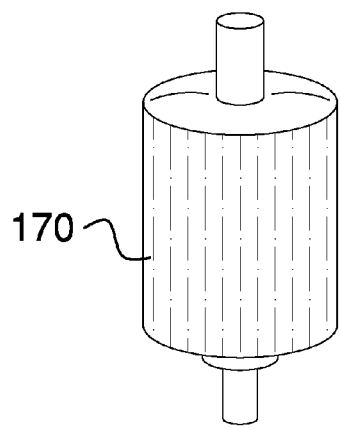
FIGS. 16-23 are diagrammatic illustration of alternative constructions of the receptacle and chemical concentrate types that can be employed.

In FIG. 16, there is diagrammatically illustrated an alternative construction of the receptacle 64. Here the receptacle 64 is shown as a solid of chemical concentrate 170.

Figure 17:
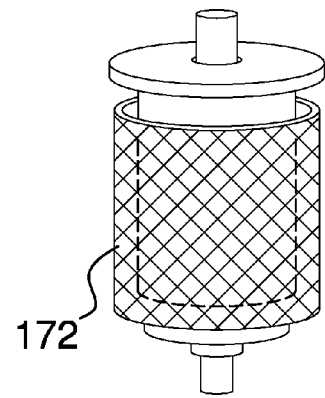

In FIG. 17, there is diagrammatically illustrated yet another alternative construction of the receptacle 64. Here the receptacle 64 is shown as a fine strainer 172 or porous receptacle to restrain chemical debris of material from dissolved solid from clogging water flow.

Figure 18:
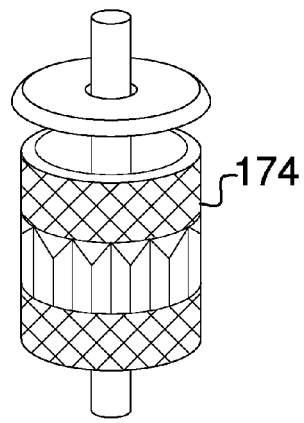

In FIG. 18, there is diagrammatically illustrated yet another alternative construction of the receptacle 64. Here the receptacle 64 is shown as a porous receptacle 174 having a ring of vanes.

Figure 19:
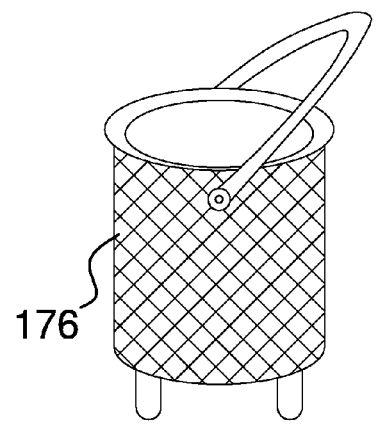

In FIG. 19, there is diagrammatically illustrated yet another alternative construction of the receptacle 64. Here the receptacle 64 is shown as a porous receptacle 176 of a non-rotational type with a cove lid to be inserted into the mixing chamber and also for receiving granulated chemical concentrate.

Figure 20:
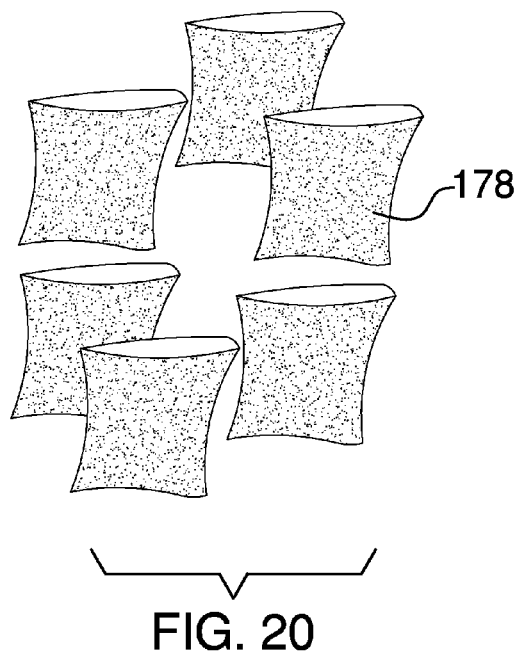

In FIG. 20, there is diagrammatically illustrated a plurality of pre-packaged packets 178 of chemical concentrate which could be deposited into any one of the receptacles 64 that has been described.

Figure 21:
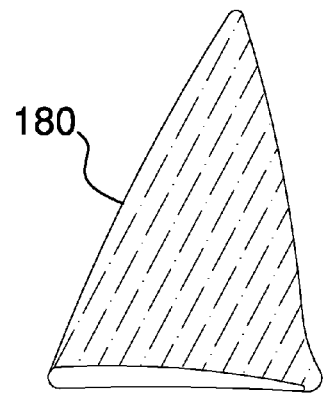

In FIG. 21, there is diagrammatically illustrated granular chemical solution 180 which could be deposited into any one of the receptacles 64.

Figure 22:
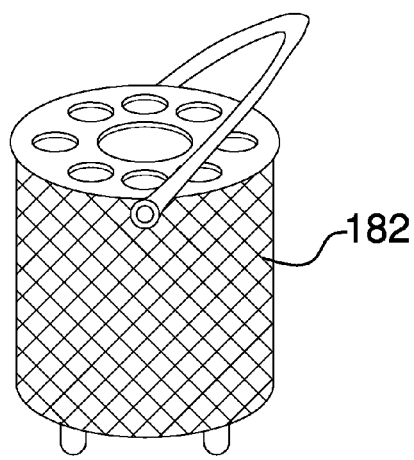
Figure 23:
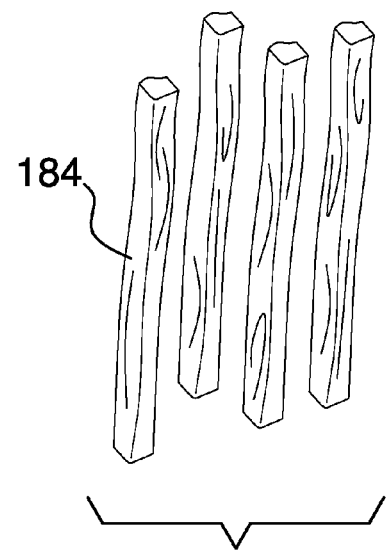

In FIG. 22, there is diagrammatically illustrated yet another alternative construction to the receptacle 64. Here the receptacle 64 is shown as a porous crate 182 for receiving chemical concentrate in stick form 184, as shown in FIG. 23.

A number of embodiments of the present invention have been described. Nevertheless, it will be understood that various modifications may be made without departing from the spirit and scope of the invention.

What is claimed is:

1. A chemical dispensing apparatus for use in delivery of a treatment solution to a lawn, the apparatus comprising:
    a main fluid supply passage configured for connection to a pipe system carrying water under pressure;
    a housing including an internal cavity, an end having an opening into said internal cavity, a discharge port and a drain port;
    a fluid discharge passage connecting said discharge port and said internal cavity;
    an internal fluid supply passage connecting said main fluid supply passage to said internal cavity;
    a drain passage connecting said internal cavity to said drain port;
    a float valve disposed across said drain passage and across said internal fluid supply passage, said float valve including a float that is displaced by a fluid flow through said internal fluid supply passage from said main fluid supply passage from a first position where said drain passage is open and said internal fluid supply passage is sealed by said float to a second position where said internal fluid supply passage is open and said drain passage is sealed by said float, said float returning to said first position when said fluid flow is stopped;
    a container removably disposed within said internal cavity and supported for rotation therein about a vertical axis, said container configured for the reception of a chemical concentrate, said container having vanes extending the circumference thereof;
    a nozzle disposed across said internal fluid passage and arranged to direct a jet of water at said vanes, the impingement of said jet of water on said vanes causing said container to rotate about said vertical axis; and
    a lid removably attached to said housing, said lid sealing said opening into said internal cavity when attached to said housing.

2. The apparatus of claim 1, wherein said main fluid supply passage is configured at opposite ends thereof for inline connection to the pipe system carrying water under pressure.

3. The apparatus of claim 1, wherein said discharge fluid passage, said drain passage and said internal fluid supply passage are each defined by said housing.

4. The apparatus of claim 1, further comprising:
    a sprinkler head connected to said discharge port.

5. The apparatus of claim 1, further comprising:
    a bypass fluid passage connecting said main fluid supply passage to said fluid discharge passage; and
    a control valve connected to said main fluid supply passage, said fluid bypass passage and said internal fluid supply passage and operable to selectively permit or preclude the flow of fluid from said main fluid supply passage through said bypass passage and said internal fluid supply passage.

6. The apparatus of claim 5, further comprising:
    a flap valve operable to fluidically connect said fluid discharge passage to said discharge port and seal said fluid bypass passage from said discharge portion when a fluid flows through said fluid discharge passage or to fluidically connect said bypass passage to said discharge portion and seal said fluid discharge passage from said discharge portion when a fluid flows through said bypass passage.

7. The apparatus of claim 1, wherein said vanes are disposed on said container such that when said container is disposed in said internal cavity in a first position said nozzle is not disposed to direct said fluid jet at said vanes, and such that when said container is disposed in said internal cavity in a second position said nozzle is disposed to direct said fluid jet at said vanes.

8. The apparatus of claim 1, further comprising:
    an internal reservoir tank connected inline to said drain passage intermediate said float valve and said drain port to receive and hold a quantity of fluid flowing through said drain passage from said internal cavity;
    a one-way valve connected to said drain passage at an upstream end from said internal reservoir tank;
    a second drain valve connected to said drain passage at a downstream end from said internal reservoir tank; and
    a siphon tube connecting said internal reservoir tank and said fluid discharge passage, wherein a fluid flow through said fluid discharge passage results in a vacuum on said siphon tube that causes fluid contained within said internal reservoir tank to be drawn into said fluid flow.

9. The apparatus of claim 8, wherein said main fluid supply passage is configured at opposite ends thereof for inline connection to the pipe system carrying water under pressure.

10. The apparatus of claim 8, wherein said discharge fluid passage, said drain passage and said internal fluid supply passage are each defined by said housing.

11. The apparatus of claim 8, further comprising:
a sprinkler head connected to said discharge port.

12. The apparatus of claim 8, further comprising:
a bypass fluid passage connecting said main fluid supply passage to said fluid discharge passage; and
a control valve connected to said main fluid supply passage, said fluid bypass passage and said internal fluid supply passage and operable to selectively permit or preclude the flow of fluid from said main fluid supply passage through said bypass passage and said internal fluid supply passage.

13. The apparatus of claim 12, further comprising:
a flap valve operable to fluidically connect said fluid discharge passage to said discharge port and seal said fluid bypass passage from said discharge portion when a fluid flows through said fluid discharge passage or to fluidically connect said bypass passage to said discharge portion and seal said fluid discharge passage from said discharge portion when a fluid flows through said bypass passage.

14. The apparatus of claim 8, wherein said vanes are disposed on said container such that when said container is disposed in said internal cavity in a first position said nozzle is not disposed to direct said fluid jet at said vanes, and such that when said container is disposed in said internal cavity in a second position said nozzle is disposed to direct said fluid jet at said vanes.

* * * * *